United States Patent
G V et al.

(10) Patent No.: US 9,964,182 B2
(45) Date of Patent: May 8, 2018

(54) MULTI-STAGE TRANSMISSION

(71) Applicant: GM Global Technology Operations LLC, Detroit, MI (US)

(72) Inventors: Ravikanth G V, Bangalore (IN); Nidhish Tripathi, Bengaluru (IN); Venu Ganti, Marathahall (IN); Sandhu Kurian Kurian, Kottayam (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 264 days.

(21) Appl. No.: 14/871,158

(22) Filed: Sep. 30, 2015

(65) Prior Publication Data
US 2016/0146293 A1    May 26, 2016

Related U.S. Application Data (60) Provisional application No. 62/082,424, filed on Nov. 20, 2014.

(51) Int. Cl.
*F16H 3/08* (2006.01)
*F16H 3/091* (2006.01)
*F16H 37/04* (2006.01)

(52) U.S. Cl.
CPC .......... *F16H 3/091* (2013.01); *F16H 37/043* (2013.01); *F16H 2200/0052* (2013.01)

(58) Field of Classification Search
CPC .................. F16H 37/021; F16H 2003/0931
USPC ...................................... 74/325, 331
See application file for complete search history.

(56) References Cited

U.S. PATENT DOCUMENTS

| | | | |
|---|---|---|---|
| 9,212,726 B2* | 12/2015 | Eo | F16H 3/006 |
| 2005/0139035 A1* | 6/2005 | Lee | B60K 6/36 |
| | | | 74/661 |
| 2013/0263682 A1* | 10/2013 | Eo | F16H 3/006 |
| | | | 74/331 |

FOREIGN PATENT DOCUMENTS

| | | |
|---|---|---|
| CN | 2679422 Y | 2/2005 |
| CN | 103867690 A | 6/2014 |

* cited by examiner

*Primary Examiner* — Ha Dinh Ho (57) ABSTRACT

A multi-stage transmission includes a first stage, a second stage, a final drive, and at least two torque transmitting devices. The at least two torque transmitting members selective couple the first stage, the second stage and the final drive with each other to produce a reverse gear or one of a plurality of forward gears.

17 Claims, 10 Drawing Sheets

| STAGE 1 | STAGE 2 |
|---|---|
| (22) 3.9 | 1 |
| (24) 2.6 | |
| (26) 1.86 | (48) 3.1 |

| GEAR 1 | GEAR 2 | GEAR 3 | GEAR 4 | GEAR 5 | GEAR 6 |
|---|---|---|---|---|---|
| 3.9 | 2.6 | 1.86 | 1.26 | 0.84 | 0.6 |

MULTI-STAGE TRANSMISSION

RELATED APPLICATION

The present application claims the benefit of U.S. Provisional Patent Application No. 62/082,424, filed on Nov. 20, 2014.

The entire contents of the above application are incorporated herein by reference.

FIELD

The present disclosure relates to a manual transmission for motor vehicles. More specifically, the present disclosure relates to a multi-stage manual transmission.

BACKGROUND

The statements in this section merely provide background information related to the present disclosure and may or may not constitute prior art.

A typical multiple speed transmission employs a combination of torque transmitting devices and selectively engaged torque transmitting devices that achieve a plurality of speed or gear ratios. The arrangement of the various components of a transmission, generally, is dictated by packaging requirements, cost and desired speed ratios.

While current transmissions achieve their intended purpose, the need for new and improved transmission configurations which exhibit improved performance and improved packaging, primarily reduced size and weight, remains constant.

SUMMARY

The present invention provides an improved multi-stage transmission.

Accordingly, in one aspect of the invention, a multi-stage transmission includes a first stage, a second stage, a final drive, and at least two torque transmitting devices. The at least two torque transmitting devices selectively couple the first stage, the second stage and the final drive with each other to produce a reverse gear or one of a plurality of forward gears.

In another aspect, a multi-stage transmission includes a first stage with a first torque transmitting device and a second torque transmitting device, a second stage with a third torque transmitting device, and a final drive. The torque transmitting devices selectively couple the first stage, the second stage and the final drive with each other to produce a reverse gear or one of a plurality of forward gears.

In yet another aspect, a multi-stage transmission includes a first stage with a first torque transmitting device and a second torque transmitting device, as well as four gear sets; a second stage with a third torque transmitting device and a third torque transmitting device, as well as one gear set; and a final drive with one gear set. The torque transmitting devices selectively couple the first stage, the second stage and the final drive with each other to produce a reverse gear or one of a plurality of forward gears Any of the aforementioned multi-stage transmissions may be further characterized by one or any combination of the features described herein, such as, for example: one of the at least two torque transmitting devices is associated with the first stage, and another of the at least two torque transmitting devices is associated with the second stage; the first stage includes two torque transmitting devices; the second stage includes a third torque transmitting device; the at least two torque transmitting devices are synchronizers; the at least two torque transmitting devices are clutches; the transmission has six forward gears; the first stage has four gear sets; the second stage has one gear set; and the final drive has one gear set.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
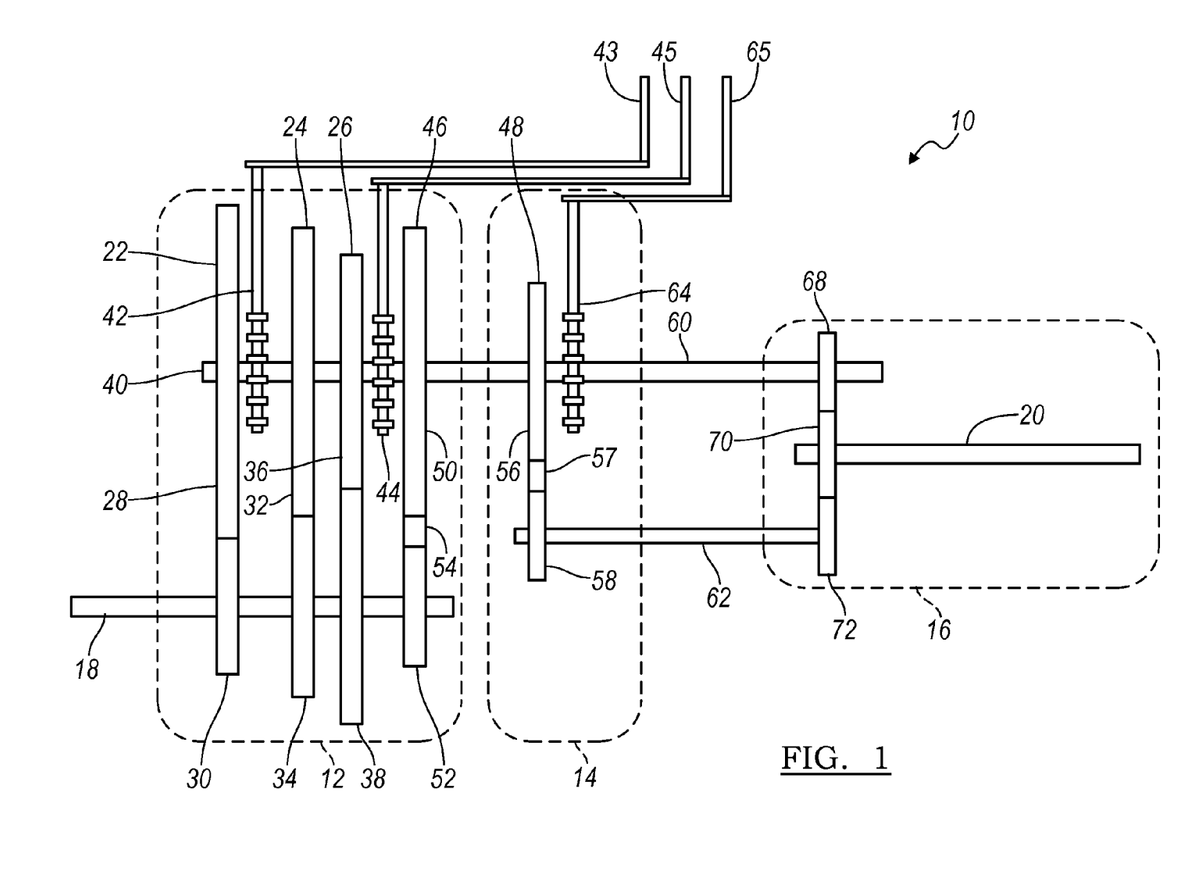
FIG. 1 is a schematic diagram of a multi-stage transmission in neutral in accordance with the principles of the present invention.

Referring now to the drawings, a multi-stage transmission for a motor vehicle embodying the principles of the present invention is illustrated in FIG. 1 and designated at 10. The multi-stage transmission 10 includes a first stage 12, a second stage 14 and a final drive 16.

The first stage 12 includes a first gear set 22 with a first member 28 and a second member 30, a second gear set 24 with a third member 32 and a fourth member 34, a third gear set 26 with a fifth member 36 and a sixth member 38, and a fourth (or reverse) gear set 46 with a seventh member 50 and an eighth member 52 as well as an idler 54 that couples seventh member 50 to the eight member 52. The first stage 12 also includes a first synchronizer 42 operated with a lever 43 and a second synchronizer 44 operated with a lever 45. As described in detail below the synchronizers 42 and 44 selectively couple the first gear set 22, the second gear set 24, the third gear set 26 or the fourth gear set 48 to an input shaft 18 with a first interconnecting member or shaft 40, which couples the first stage 12 with the second stage 14.

The second stage 14 includes a fifth gear set 48 with a ninth member 56 and a tenth member 58 as well as an idler 57 that couples the ninth member 56 with the tenth member 58. The second stage also includes a third synchronizer 64 that selectively couples the fifth gear set 48 with the interconnecting member or shaft 40 and an interconnecting member or shaft 60 or an interconnecting member or shaft 62.

The final drive 16 includes a sixth gear set 67 with an eleventh member 68, a twelfth member 70 and a thirteenth member 72. The eleventh member 68 is coupled to the first interconnecting member or shaft 60 and the thirteenth member 72 is coupled to the second interconnecting member or shaft 62. A drive shaft 20 is connected to the twelfth member 70 which in turn couples with the eleventh member 68 and the thirteenth member 72.

Figure 2:
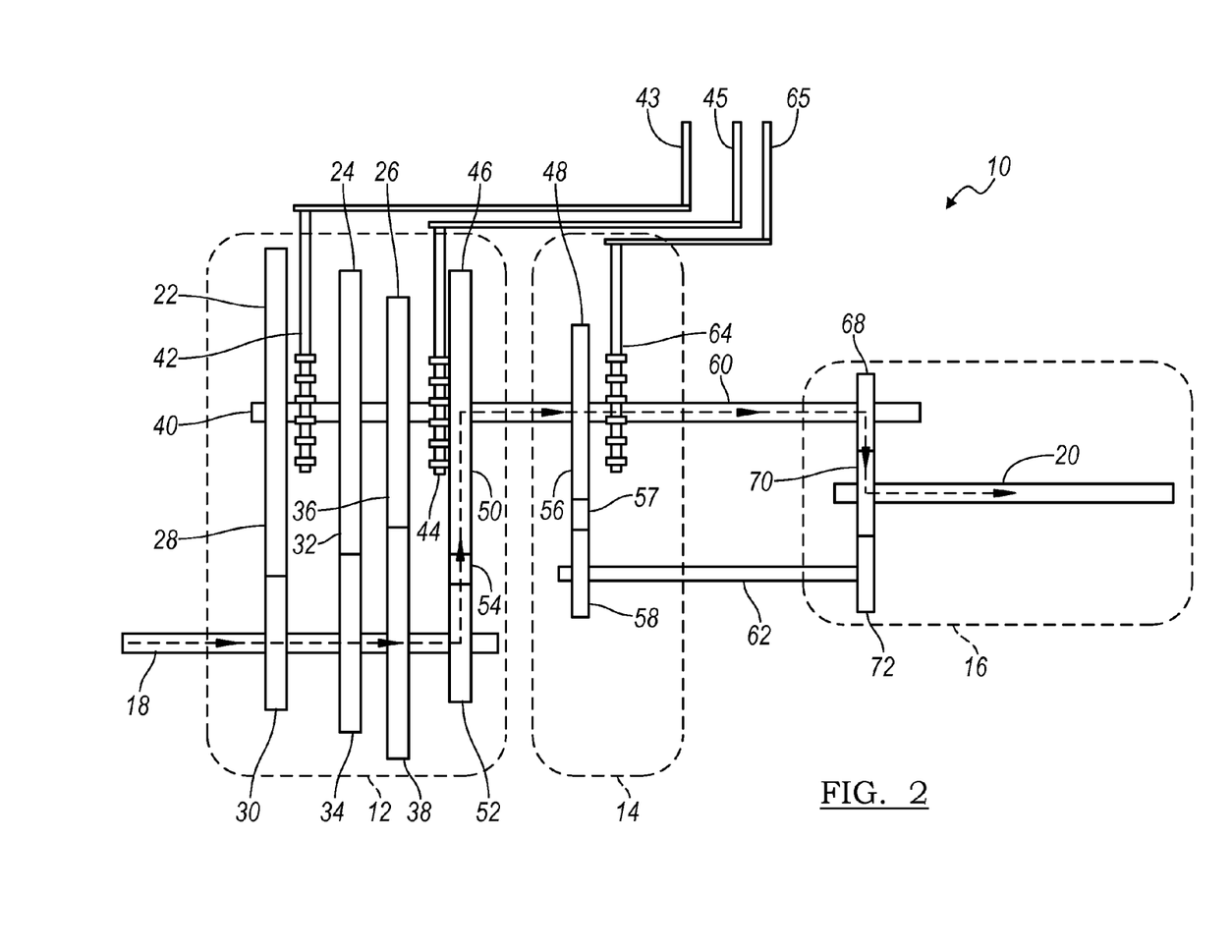
FIG. 2 is a schematic diagram of the multi-stage transmission in a reverse gear in accordance with the principles of the present invention.

The multi-stage transmission is shown in neutral in FIG. 1. To operate the multi-stage transmission 10 in a reverse gear (FIG. 2), the first synchronizer 42 is unengaged from either the first gear set 22 or the second gear set 24 and the third synchronizer 64 is unengaged from the fifth gear set 48, while the first interconnecting member or shaft 40 is coupled to the second interconnecting member or shaft 60. The lever 45 is operated to engage the second synchronizer 44 with the seventh member 50 of the fourth gear set 46. Since the idler 54 couples the seventh member 50 with the eighth member 52, the fourth gear set 46 couples the input shaft 18 with the first interconnecting member or shaft 40 when the multi-stage transmission 10 is in reverse gear. Accordingly, when the multi-stage transmission 10 is in reverse gear, the input shaft 18 receives input torque that is transmitted through the fourth gear set 46, the first interconnecting member of shaft 40, the second interconnecting member or shaft 60, the eleventh member 68, the twelfth member 70 and the drive shaft 20 which in turn provides drive torque to, for example, drive wheels of the motor vehicle. The torque path for the multi-stage transmission 10 in reverse gear is indicated by the arrows in FIG. 2.

Figure 3:
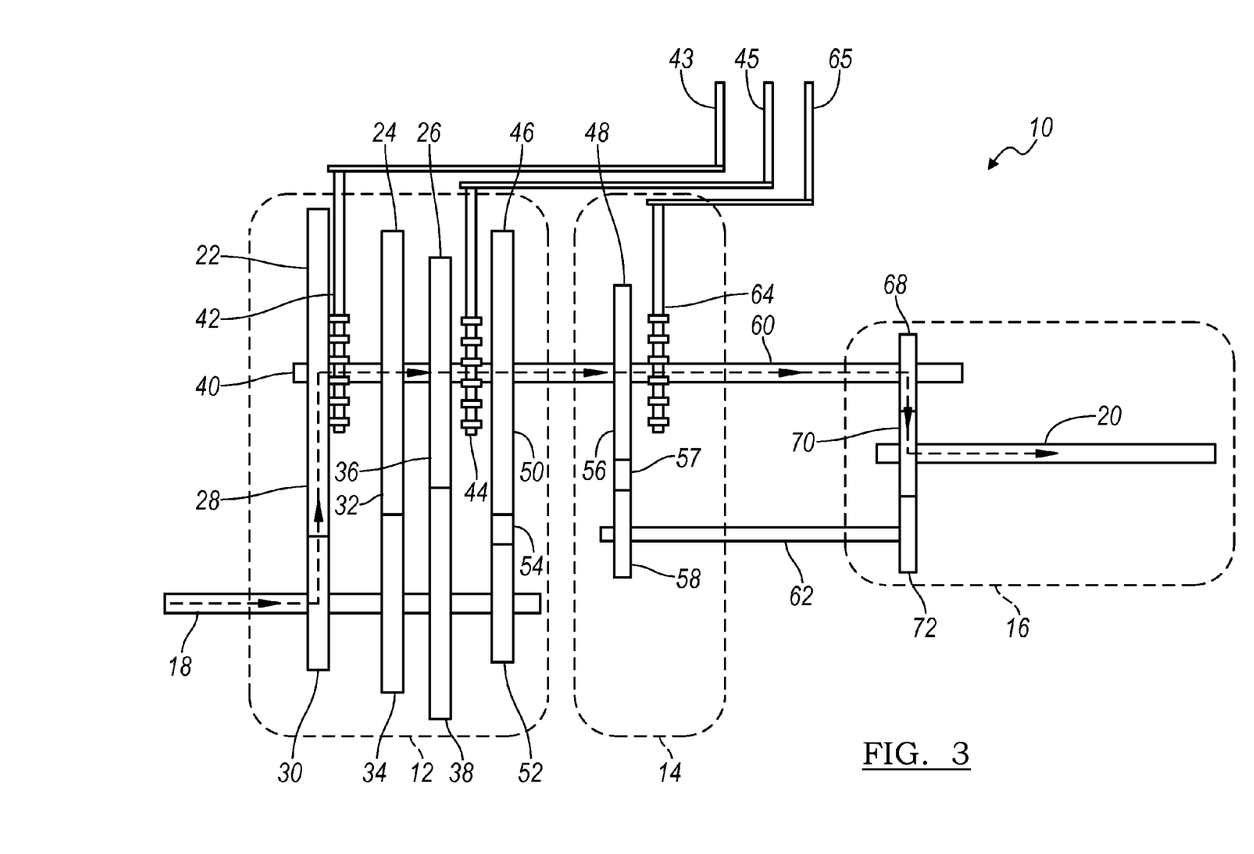
FIG. 3 is a schematic diagram of the multi-stage transmission in a first forward gear in accordance with the principles of the present invention.

To operate the multi-stage transmission 10 in a first forward gear, as shown in FIG. 3, the second synchronizer 44 is unengaged from either the third gear set 26 or the fourth gear set 46 and the third synchronizer 64 is unengaged from the fifth gear set 48, while the first interconnecting member or shaft 40 is coupled to the second interconnecting member or shaft 60. The lever 43 is operated to engage the first synchronizer 42 with the first member 28 of the first gear set 22. Since the first member 28 couples with the second member 30, the input shaft 18 is coupled to the first interconnecting member or shaft 40 through the first gear set 22 when the multi-stage transmission 10 is in first forward gear. Accordingly, when the multi-stage transmission 10 is in first forward gear, the input shaft 18 receives input torque that is transmitted through the first gear set 22, the first interconnecting member of shaft 40 and the second interconnecting member or shaft 60, the eleventh member 68, the twelfth member 70 and the drive shaft 20 which in turn provides drive torque to, for example, drive wheels of the motor vehicle. The torque path for the multi-stage transmission 10 in first forward gear is indicated by the arrows in FIG. 3.

Figure 4:
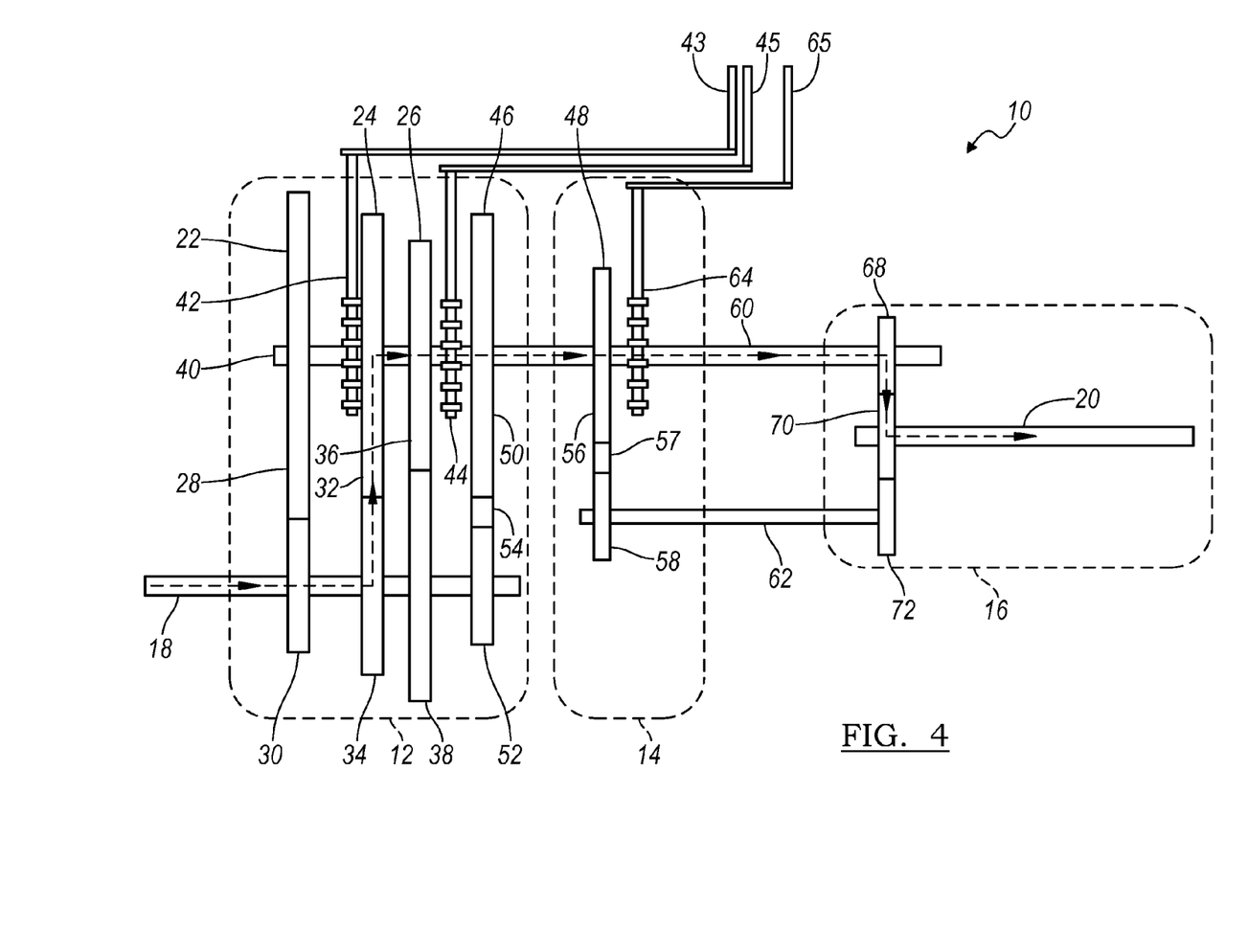
FIG. 4 is a schematic diagram of the multi-stage transmission in a second forward gear in accordance with the principles of the present invention.

To operate the multistage transmission 10 in a second forward gear, as shown in FIG. 4, the second synchronizer 44 is unengaged from either the third gear set 26 or the fourth gear set 46 and the third synchronizer 64 is unengaged from the fifth gear set 48, while the first interconnecting member or shaft 40 is coupled to the second interconnecting member or shaft 60. The lever 43 is operated to engage the first synchronizer 42 with the third member 32 of the second gear set 24. Since the third member 32 couples with the fourth member 34, the input shaft 18 is coupled to the first interconnecting member or shaft 40 through the second gear set 24 when the multi-stage transmission 10 is in second forward gear. Accordingly, when the multi-stage transmission 10 is in second forward gear, the input shaft 18 receives input torque that is transmitted through the second gear set 24, the first interconnecting member of shaft 40 and the second interconnecting member or shaft 60, the eleventh member 68, the twelfth member 70 and the drive shaft 20 which in turn provides drive torque to, for example, drive wheels of the motor vehicle. The torque path for the multi-stage transmission 10 in second forward gear is indicated by the arrows in FIG. 4.

Figure 5:
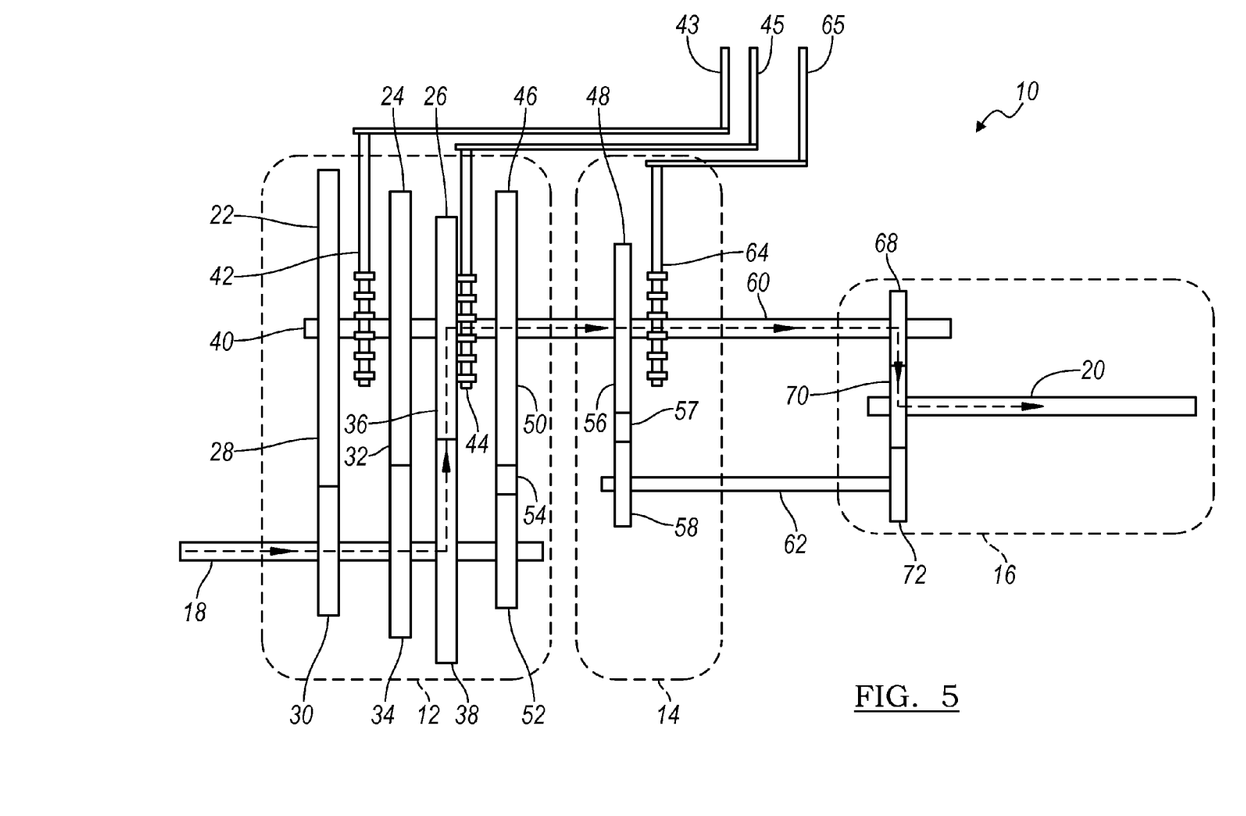
FIG. 5 is a schematic diagram of the multi-stage transmission in a third forward gear in accordance with the principles of the present invention.

To operate the multistage transmission 10 in a third forward gear, as shown in FIG. 5, the first synchronizer 42 is unengaged from either the first gear set 22 or the second gear set 24 and the third synchronizer 64 is unengaged from the fifth gear set 48, while the first interconnecting member or shaft 40 is coupled to the second interconnecting member or shaft 60. The lever 45 is operated to engage the second synchronizer 44 with the fifth member 36 of the third gear set 26. Since the fifth member 36 couples with the sixth member 38, the input shaft 18 is coupled to the first interconnecting member or shaft 40 through the third gear set 26 when the multi-stage transmission 10 is in third forward gear. Accordingly, when the multi-stage transmission 10 is in third forward gear, the input shaft 18 receives input torque that is transmitted through the third gear set 26, the first interconnecting member of shaft 40 and the second interconnecting member or shaft 60, the eleventh member 68, the twelfth member 70 and the drive shaft 20 which in turn provides drive torque to, for example, drive wheels of the motor vehicle. The torque path for the multi-stage transmission 10 in second forward gear is indicated by the arrows in FIG. 5.

Figure 6:
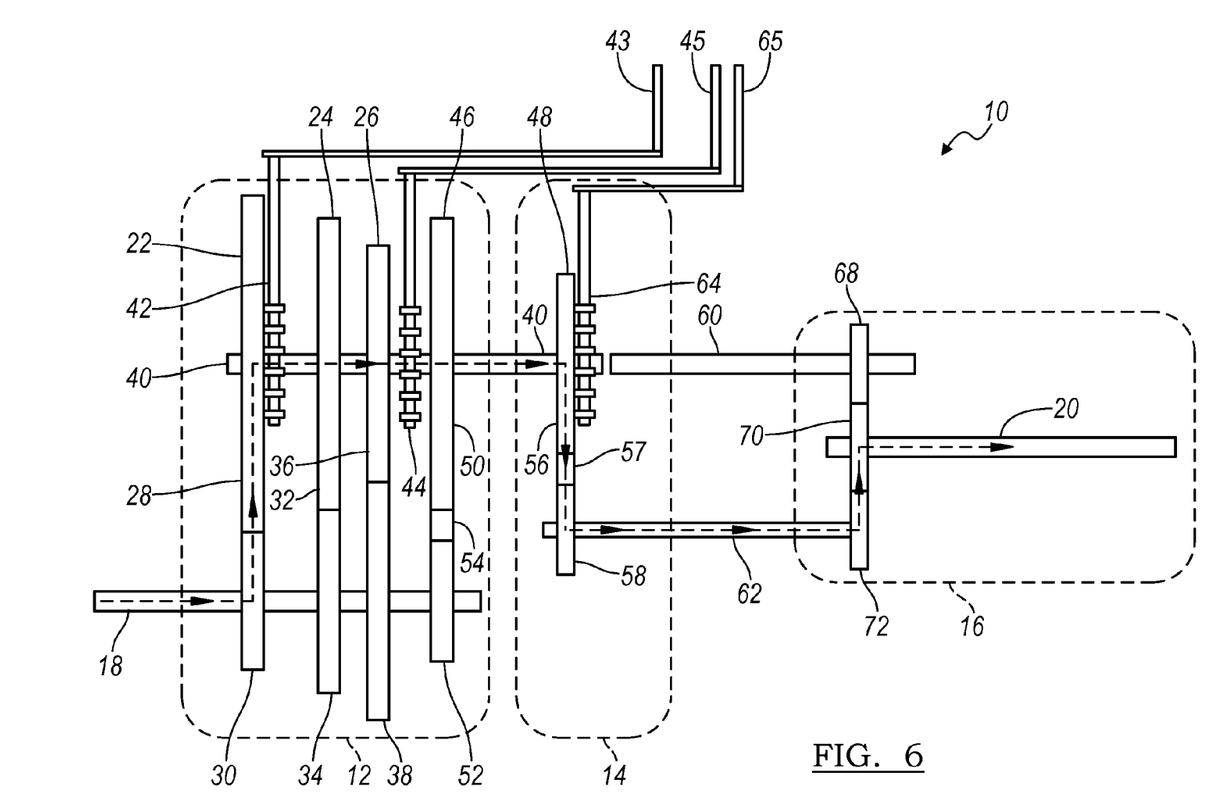
FIG. 6 is a schematic diagram of the multi-stage transmission in a fourth forward gear in accordance with the principles of the present invention.

To operate the multistage transmission 10 in a fourth forward gear, as shown in FIG. 6, the second synchronizer 44 is unengaged from either the third gear set 26 or the fourth gear set 46. The lever 43 is operated to engage the first synchronizer 42 with the first member 28 of the first gear set 22, and the lever 65 is operated to engage the third synchronizer 64 with the ninth member 56 of the fourth gear set 48, while the first interconnecting member or shaft 40 is uncoupled from the second interconnecting member or shaft 60, such that the second interconnecting member or shaft 60 is free-wheeling. Since the first member 28 couples with the second member 30, the input shaft 18 is coupled to the first interconnecting member or shaft 40 through the first gear set 22 when the multi-stage transmission 10 is in fourth forward gear. Further, since the idler 57 couples the ninth member 56 with the tenth member 58 of the fourth gear set 48, the first interconnecting member or shaft 40 is coupled to the third interconnecting member or shaft 62 when the multi-stage transmission 10 is in fourth forward gear. Accordingly, when the multi-stage transmission 10 is in fourth forward gear, the input shaft 18 receives input torque that is transmitted through the first gear set 26, the first interconnecting member of shaft 40, the fourth gear set 48, the third interconnecting member or shaft 62, the thirteenth member 72, the twelfth member 70 and the drive shaft 20 which in turn provides drive torque to, for example, drive wheels of the motor vehicle. The torque path for the multi-stage transmission 10 in fourth forward gear is indicated by the arrows in FIG. 6.

Figure 7:
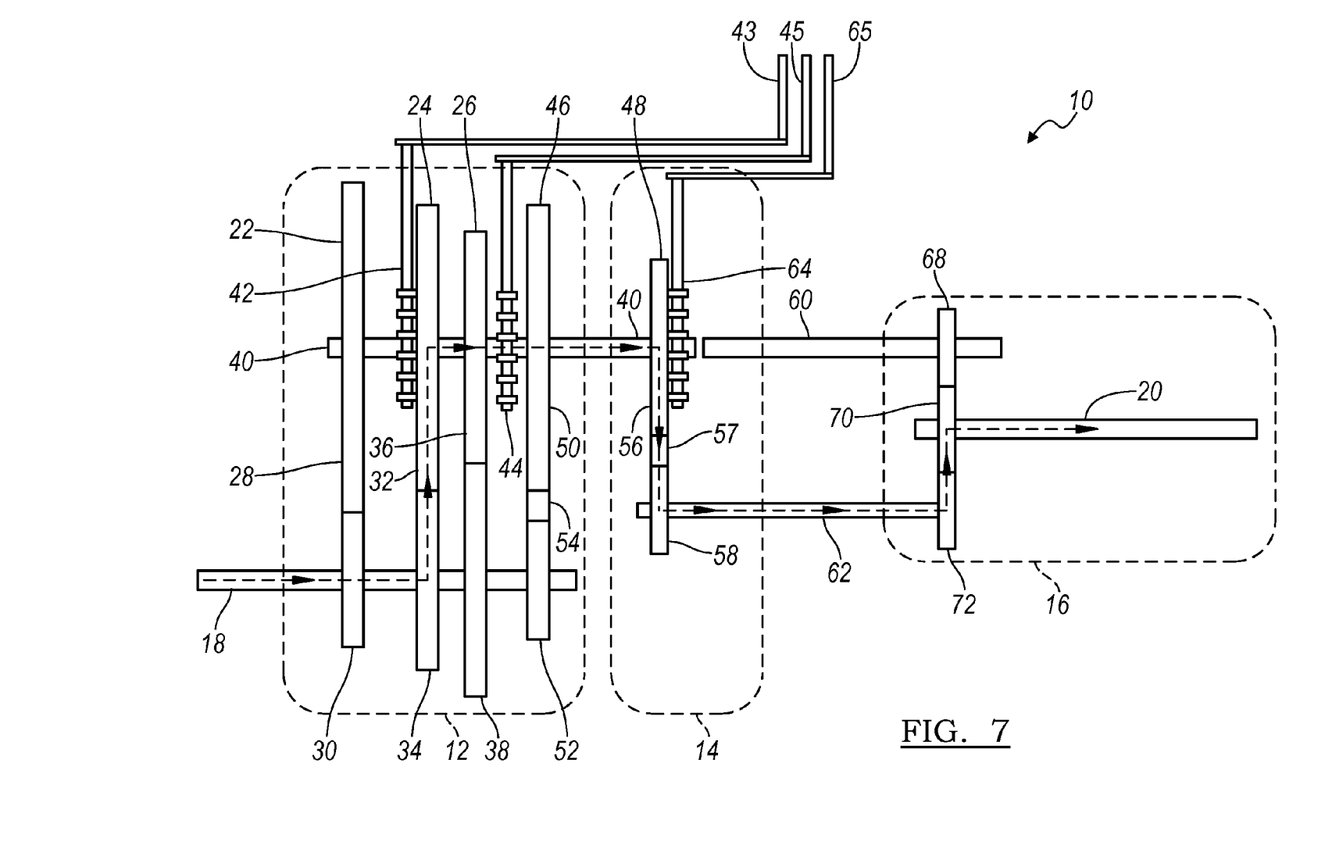
FIG. 7 is a schematic diagram of the multi-stage transmission in a fifth forward gear in accordance with the principles of the present invention.

To operate the multistage transmission 10 in a fifth forward gear, as shown in FIG. 7, the second synchronizer 44 is unengaged from either the third gear set 26 or the fourth gear set 46. The lever 43 is operated to engage the first synchronizer 42 with the third member 32 of the second gear set 24, and the lever 65 is operated to engage the third synchronizer 64 with the ninth member 56 of the fourth gear set 48, while the first interconnecting member or shaft 40 is uncoupled from the second interconnecting member or shaft 60, such that the second interconnecting member or shaft 60 is free-wheeling. Since the third member 32 couples with the fourth member 34, the input shaft 18 is coupled to the first interconnecting member or shaft 40 through the second gear set 24 when the multi-stage transmission 10 is in fifth forward gear. Further, since the idler 57 couples the ninth member 56 with the tenth member 58 of the fourth gear set 48, the first interconnecting member or shaft 40 is coupled to the third interconnecting member or shaft 62 when the multi-stage transmission 10 is in fifth forward gear. Accordingly, when the multi-stage transmission 10 is in fifth forward gear, the input shaft 18 receives input torque that is transmitted through the second gear set 24, the first interconnecting member of shaft 40, the fourth gear set 48, the third interconnecting member or shaft 62, the thirteenth member 72, the twelfth member 70 and the drive shaft 20 which in turn provides drive torque to, for example, drive wheels of the motor vehicle. The torque path for the multi-stage transmission 10 in fifth forward gear is indicated by the arrows in FIG. 7.

Figure 8:
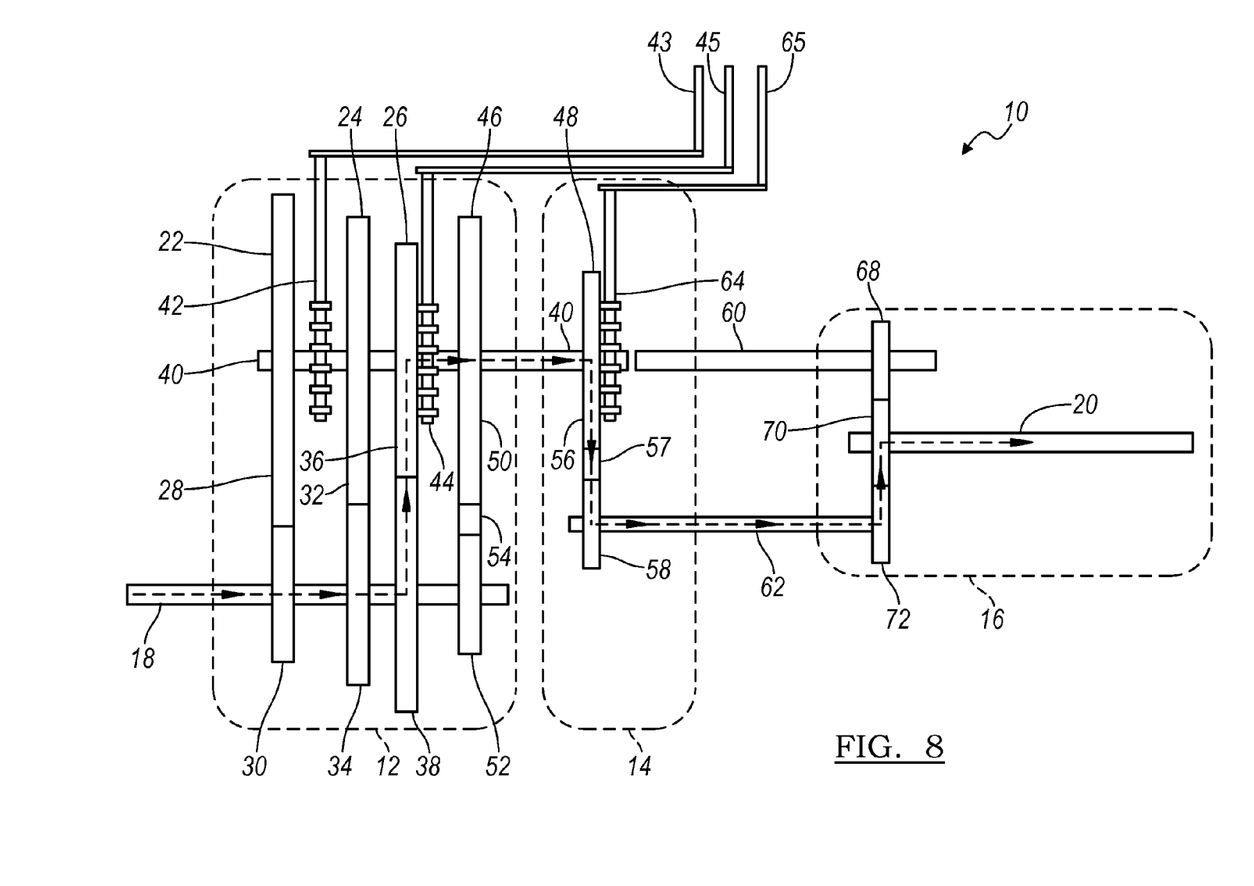
FIG. 8 is a schematic diagram of the multi-stage transmission in a sixth forward gear in accordance with the principles of the present invention.

To operate the multistage transmission 10 in a sixth forward gear, as shown in FIG. 8, the first synchronizer 42 is unengaged from either the first gear set 22 or the second gear set 24. The lever 45 is operated to engage the second synchronizer 44 with the fifth member 36 of the third gear set 26, and the lever 65 is operated to engage the third synchronizer 64 with the ninth member 56 of the fourth gear set 48, while the first interconnecting member or shaft 40 is uncoupled from the second interconnecting member or shaft 60, such that the second interconnecting member or shaft 60 is free-wheeling. Since the fifth member 36 couples with the sixth member 38, the input shaft 18 is coupled to the first interconnecting member or shaft 40 through the third gear set 26 when the multi-stage transmission 10 is in sixth forward gear. Further, since the idler 57 couples the ninth member 56 with the tenth member 58 of the fourth gear set 48, the first interconnecting member or shaft 40 is coupled to the third interconnecting member or shaft 62 when the multi-stage transmission 10 is in sixth forward gear. Accordingly, when the multi-stage transmission 10 is in sixth forward gear, the input shaft 18 receives input torque that is transmitted through the third gear set 26, the first interconnecting member of shaft 40, the fourth gear set 48, the third interconnecting member or shaft 62, the thirteenth member 72, the twelfth member 70 and the drive shaft 20 which in turn provides drive torque to, for example, drive wheels of the motor vehicle. The torque path for the multi-stage transmission 10 in fifth forward gear is indicated by the arrows in FIG. 8.

Figure 10:
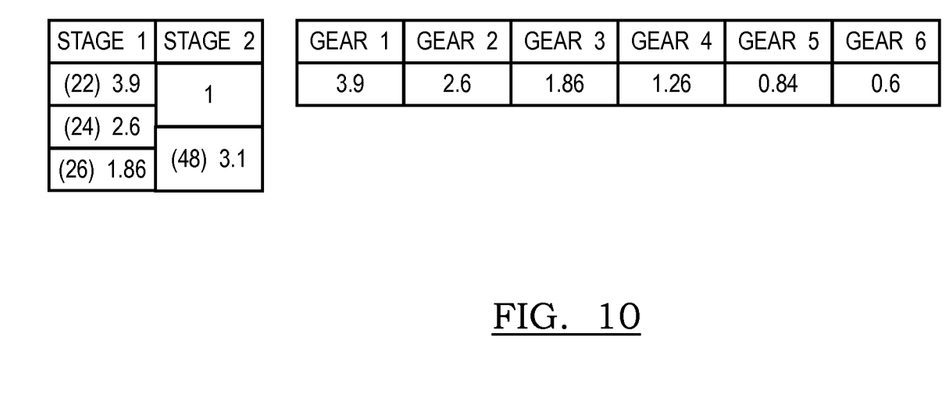
FIG. 10 is a table presenting the various combinations of gear sets of the multi-stage transmission to achieve each of the available forward and reverse gears.

Referring now to FIG. 10, the sequence of the activation or engagement of the first gear set 22, the second gear set 24, the third gear set 26 and the fourth gear set 48 which provide six forward speeds or gear ratios and reverse is illustrated. More specifically, FIG. 10 is a truth table which presents the various combinations of the gear sets 22, 24, 26 and 48 to achieve six forward speeds and reverse. Actual numerical gear ratios of the various gear states are also presented although it should be appreciated that these numerical values are just examples and that they may be adjusted over significant ranges to accommodate various applications and operational criteria of the multi-stage transmission 10. Other gear ratios are achievable depending, for example, on the gear diameter, gear teeth count and gear configuration selected.

Note that the multi-stage transmission 10 is not limited to the gear sets described above to provide six forward speeds and one reverse speed. For example, the first stage 12 may include fewer or greater than four gear sets and fewer or greater than two synchronizers, and the second stage 14 may include greater than one gear set and greater than one synchronizer to provide less than or greater than six forward speeds. For example, the fourth (or reverse) gear set 46 can be included in the second stage 14, which may include an additional synchronizer. Hence, in some arrangements, the first stage 12 can include three gear sets and two synchronizers, and the second stage 14 can include two gear sets and two synchronizers.

Figure 9A:
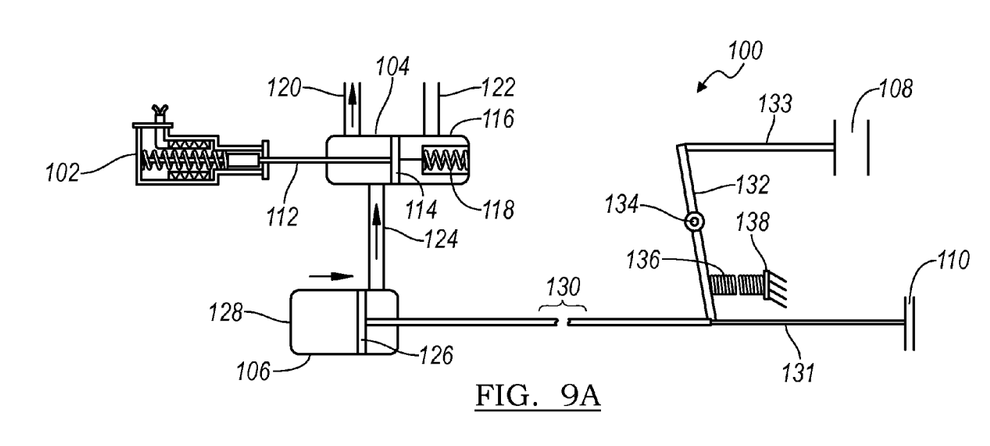
FIGS. 9A and 9B are schematic diagrams illustrating the operation of a pair of torque transmitting devices for the multi-stage transmission in accordance with the principles of the present invention.
Figure 9B:
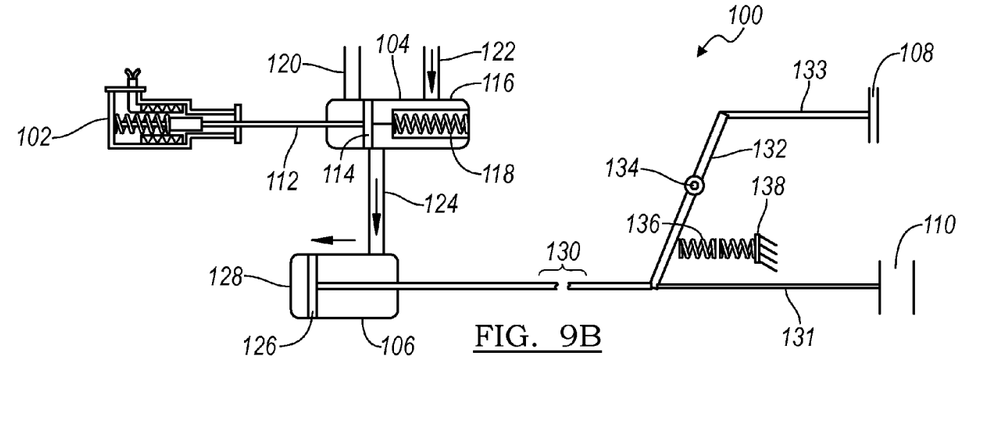

In another arrangement, at least two of the first synchronizer 42, the second synchronizer 44 and the third synchronizer 64 are replaced with a pair of torque transmitting devices such as a first clutch 108 and a second clutch 110 operated in a system 100 shown in FIGS. 9A and 9B. The system 100 includes an actuator 102, such as, an electric solenoid actuator, a first piston 104 and a second piston 106. The first piston 104 includes a sliding member 114 disposed in a housing 116 and connected to the actuator 102 with a first interconnecting member or rod 112. A biasing member such as a spring 118 also disposed in the housing 116 applies a biasing force on the sliding member 114 toward the actuator 102. The first piston 104 is in fluid communication with the second piston 106 through a conduit 124. The first piston 104 further includes an exhaust 120 and an inlet 122.

The second piston 106 includes a sliding member 126 disposed in a housing 128 and is coupled to the first clutch 108 and the second clutch 110 with a second interconnecting member or rod 130 and a set of links 131, 132 and 133. Specifically, the link 131 is coupled to the second clutch 110, the link 133 is coupled to the first clutch, and the interconnecting member 130 is coupled to the links 131 and 132 which in turn is coupled to the link 133. The link 132 supported at a pivot or fulcrum 134, and a biasing member such as a spring 136 is positioned between the link 132 and a stationary member 138 as shown in FIGS. 9A and 9B.

The system 100 enables operating the two clutches 108 and 110 with a single actuator such as the actuator 102. When the actuator 102 is turned on (FIG. 9A), the first interconnecting member or rod 112 is pushed toward the first piston 104. Hence, the sliding member 114 is pushed away from the actuator 102 toward the spring 118 while gas such as air flows from the second piston 106 flows to the first piston 104 through the conduit 124 to fill the expanding volume in the housing 116. The gas also escapes from the first piston 104 through the exhaust 120. Movement of the sliding member 114 toward the spring 118 compresses the spring 118, and gas flowing from the second piston 106 causes the sliding member 126 to move toward the clutches 108 and 110. The movement of the sliding member 126 also pushes the second interconnecting member or rod 130 toward the clutches 108 and 110 as well. As this occurs, the link 131 is pushed toward the second clutch 110 to engage the second clutch 110 while the link 132 rotates counterclockwise about the pivot 134. The rotation of the link 132 compresses the spring 136 against the stationary member 138 and pulls the link 133 away from the first clutch 108 to disengage the first clutch 108.

When the actuator 102 is turn off (FIG. 9B), the biasing force imparted by the spring 118 pushes the first interconnecting member or rod 112 toward the actuator 102 while gas such as compressed air flows into the housing 116 though the inlet 122. The gas also flows to the second piston 106 through the conduit 124. As gas flows into the housing 128 of the second piston 106, the sliding member 126 is pushed away from the clutches 108 and 110. The movement of the sliding member 126 pulls the second interconnecting member or rod 130 away from the clutches 108 and 110 as well. As this occurs, the link 131 and the lower portion of the link 132 below the pivot 134 are pulled away from the second clutch 110 while the biasing force imparted by the spring 136 on the link 132 pushes on the lower portion of the link 132 which causes the link 132 to rotate clockwise. Clockwise movement of the link 132 about the pivot 134 results in movement of the link 133 toward the first clutch 108 to engage the first clutch 108 and movement of the link 131 away from the second clutch 110 to disengage the second clutch 110.

The description of the invention is merely exemplary in nature and variations that do not depart from the gist of the invention are intended to be within the scope of the invention. Such variations are not to be regarded as a departure from the spirit and scope of the invention.

What is claimed is:

1. A multi-stage transmission comprising:
   a first stage with two torque transmitting devices;
   a second stage with a single torque transmitting device; and
   a final drive,
   wherein the torque transmitting devices selectively couple the first stage, the second stage and the final drive with each other to produce a reverse gear or one of a plurality of forward gears.
2. The transmission of claim 1 wherein the torque transmitting devices are synchronizers.
3. The transmission of claim 1 wherein the torque transmitting devices are clutches.
4. The transmission of claim 1 wherein the transmission has six forward gears.
5. The transmission of claim 1 wherein the first stage has four gear sets.
6. The transmission of claim 1 wherein the second stage has one gear set.
7. The transmission of claim 1 wherein the final drive has one gear set.
8. A multi-stage transmission comprising:
   a first stage with a first torque transmitting device and a second torque transmitting device;
   a second stage with a single torque transmitting device; and
   a final drive,
   wherein the torque transmitting devices selectively couple the first stage, the second stage and the final drive with each other to produce a reverse gear or one of a plurality of forward gears.
9. The transmission of claim 8 wherein the torque transmitting devices are synchronizers.
10. The transmission of claim 8 wherein the torque transmitting devices are clutches.
11. The transmission of claim 8 wherein the transmission has six forward gears.
12. The transmission of claim 8 wherein the first stage has four gear sets.
13. The transmission of claim 8 wherein the second stage has one gear set.
14. The transmission of claim 8 wherein the final drive has one gear set.
15. A multi-stage transmission comprising:
    a first stage with a first torque transmitting device, a second torque transmitting device and four gear sets;
    a second stage with a single torque transmitting device and one gear set; and
    a final drive with one gear set,
    wherein the torque transmitting devices selectively couple the first stage, the second stage and the final drive with each other to produce a reverse gear or one of a plurality of forward gears.
16. The transmission of claim 15 wherein the transmission has six forward gears.
17. The transmission of claim 15 wherein the torque transmitting devices are synchronizers.

* * * * *